United States Patent

[11] 3,624,121

[72] Inventor Terry G. Selin
Schenectady, N.Y.
[21] Appl. No. 56,663
[22] Filed July 20, 1970
[45] Patented Nov. 30, 1971
[73] Assignee General Electric Company
Original application Jan. 3, 1969, Ser. No. 788,948. Divided and this application July 20, 1970, Ser. No. 56,663

[54] NEW CHELATES OF SILICON
3 Claims, No Drawings
[52] U.S. Cl. ................................................. 260/448.8 R,
260/46.5 G, 260/398
[51] Int. Cl. .................................................... C07f 7/04,
C07f 7/18
[50] Field of Search ............................................ 260/448.8 R

[56] References Cited
UNITED STATES PATENTS

| | | | |
|---|---|---|---|
| 3,355,477 | 11/1967 | Frye .............................. | 260/448.8 R |
| 3,360,525 | 12/1967 | Frye .............................. | 260/448.8 R X |
| 3,445,426 | 5/1969 | Lee ............................... | 260/448.8 R X |
| 3,455,980 | 7/1969 | Frye .............................. | 260/448.8 R |
| 3,508,946 | 4/1970 | Plueddemann et al. ...... | 260/488.8 R X |
| 3,518,292 | 6/1970 | Frye .............................. | 260/448.8 R |

Primary Examiner—Tobias E. Levow
Assistant Examiner—P. F. Shaver
Attorneys—Donald J. Voss, E. Philip Koltos, Frank L. Neuhauser, Oscar B. Waddell and Joseph B. Forman ABSTRACT: New organosilicon chelates are formed from diketones and derivatives of diketones, where the silicon atom has functional substituents other than the diketone compound residue. The materials are useful as curing agents for room temperature vulcanizing materials.

NEW CHELATES OF SILICON

BACKGROUND OF THE INVENTION

This application is a division of my copending application Ser. No. 788,948, filed Jan. 3, 1969 and assigned to the same assignee as the present invention.

The prior art has described chelated silicon, including such chelates wherein the silicon atom is substituted, not only, with two chelating groups, but, additionally, with two organofunctional groups, in addition to the chelates. However, there has been little consideration of such materials having a total of three chelating groups on the silicon atom or of a single functional substituent, other than the chelating groups. Further, there has been no disclosure of such materials as curing agents for room temperature vulcanizing organopolysiloxane materials.

SUMMARY OF THE INVENTION

In accordance with the present invention a new class of chelates of silicon having the formula:

(1) 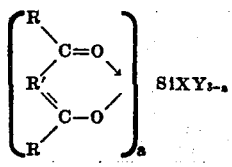

have been prepared. In the above formula, R is selected from the class consisting of lower ($C_1$–$C_6$) alkyl, lower ($C_1$–$C_6$) alkoxy, and phenyl substituents; R' is a radical of formula —($CH_2$)$_n$—CH ; X is selected from the class consisting of acyloxy of not more than eight carbon atoms and halide radicals; Y is selected from the class consisting of lower ($C_1$–$C_6$) alkyl and phenyl substituents; $a$ is from 2 to 3; and $n$ is from 0 to 2.

It has also been found that materials falling within formula (1) are extremely useful in curing organopolysiloxanes having silanol terminal groups at low temperatures, such as room temperature.

A particular advantage of this invention is that the chelates of silicon do not require additional materials in order to accomplish the curing of the silanol-terminated organopolysiloxanes. The materials of formula (1) can be dissolved in a suitable solvent, such as, chloroform and the two materials mixed, and exposed to the air for curing.

The materials according to formula (1) can be formed by reacting a diketone of formula:

(2) 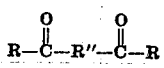

with an organosilane of formula:

(3) $Y_{3-a}SiX_{a+1}$ where R, X, and Y are as previously defined and R" is an alkylene radical of from one to three carbon atoms. In formula (3), $a$ represents the number of moles of the diketone of formula (2) which is reacted with each mole of the organosilane. The X group in the organosilane can be, as previously defined, an acyloxy group, in which case the chelate is formed directly with such a substituent, or it can be a halide, and the acyloxy group, if desired, formed by reaction with an alkali metal salt of the corresponding organic acid.

DESCRIPTION OF THE PREFERRED EMBODIMENTS

The chelates of silicon formed according to this invention can, as mentioned, be formed by a reaction as:

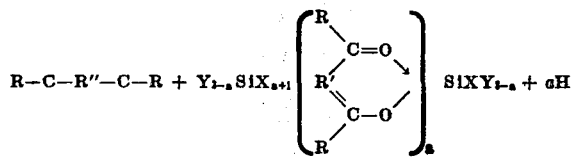

where R, R', R", X, Y, and $a$ are as previously defined.

In the above represented formulas, R represents lower alkyl groups, such as, methyl, ethyl, propyl, butyl, hexyl, isopropyl, isobutyl, etc; lower alkoxy radicals, such as, methoxy, ethoxy, propoxy, hexyloxy, isopropoxy, etc. and phenyl. R' represents radicals of formula—($CH_2$)$_n$—CH=, where $n$ is from 0 to 2, and thus, includes radicals such as—$CH_2$—CH= —$CH_2CH_2$ CH and—CH=. R" is selected from the class consisting of alkylene radicals of from one to three carbon atoms, and thus includes methylene, ethylene, and propylene.

The functional substituents represented by X include chloride, bromide, iodide, acetoxy, propionoxy, etc. Among those lower alkyl groups represented by Y are those previously described for R.

The reaction between the materials is carried out in suitable solvent, such as, ether, and the amount of ether is sufficient to retain the reactants in solution. Among the ethers are diethyl ether and tetrahydrofuran.

Preferably, the reaction is carried out at room temperature, but temperatures of from 10° to 50° C. can be effectively employed. The reactants can be reacted in a stoichiometric ratio, or in excess of the organosilicon compound of up to 30 percent or more can be used in forming the chelates of silicon.

The chelates precipitate from solution as crystalline materials and can be filtered from solution. They are then washed with the reaction solvent for purification.

The fluid silanol-terminated organopolysiloxanes which can be cured at low temperatures, including room temperatures, by the materials of formula (1) are most suitably produced from cyclic organopolysiloxanes of the general formula:

4) $(ZZ'SiO)_m$, where Z and Z' are organic radicals of not more than 18 carbon atoms each selected from the class consisting of alkyl radicals, such as, methyl, ethyl, propyl, butyl, hexyl, etc.; aryl radicals, such as, phenyl, diphenyl, naphthyl, etc.; alkaryl radicals, such as, tolyl, xylyl, ethylphenyl, etc.; aralkyl radicals, such as benzyl, phenethyl, etc.; haloaryl radicals, such as, chlorophenyl, tetrachlorophenyl, dichlorophenyl, etc.; and alkenyl radicals, such as, vinyl, allyl, etc., which are advantageously present in amounts less than 5 to 10 percent of the total number of silicon-bonded organic radicals, in the starting material; and $m$ is an integer equal to at least 3, for example, from 3 to 10, or more, depending upon the organic group in the starting organopolysiloxane.

The silanol-terminated organopolysiloxanes are generally linear fluid methyl polysiloxanes containing terminal silicon-bonded hydroxyl groups and having an average of about two methyl groups per silicon atom. These materials are well known in the art and can be prepared, for example, by starting with cyclic dimethylpolysiloxanes having the formula:

5) $[(CH_3)_2SiO]_m$, where $m$ is as previously defined. Among the preferred cyclic dimethylpolysiloxanes employed as starting materials can be mentioned, for example, hexamethylcyclotrisiloxane, octamethylcyclotetrasiloxane, and decamethylcyclopentasiloxane, as well as mixtures of these three cyclic dimethylpolysiloxanes, alone, or with higher cyclopolysiloxanes.

In preparing the linear, fluid dimethylpolysiloxane containing terminal silicon-bonded hydroxyl groups, the starting cyclic dimethylpolysiloxanes are advantageously heated at temperatures of from about 125° C. to 150° C. with small amounts of a siloxane rearrangement and condensation catalyst (about 0.001 to 0.01 percent, by weight, based on the weight of the cyclic organopolysiloxane), such as potassium hydroxide, tetrabutylphosphonium hydroxide, etc. The temperature and time at which this heating takes place will vary depending upon such factors as the particular cyclic dimethylpolysiloxane employed, the siloxane rearrangement and condensation catalyst employed, the concentration of catalyst, the desired viscosity, etc. In general, the polymerization is carried out for a time sufficient to obtain a high molecular weight product of about 150,000 to 2,000,000 centipoises viscosity, when measured at 25° C. Generally, this product is obtained in a time which varies from a few minutes to 4 to 6 or more hours, depending upon the reactants and the reaction conditions.

The high molecular weight product thus obtained is then treated with water to reduce its viscosity to about 100 to 100,000 centipoises at 25° C. This can be accomplished by blowing steam across the surface of the high molecular product for a time sufficient to give the lower viscosity material having terminal silicon-bonded hydroxyl groups. Instead of blowing steam across the surface of the high molecular product, the steam may also be forced through the product. The resulting linear fluid organopolysiloxane containing terminal silicon-bonded hydroxyl groups will have the general formula:

(6)

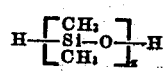

where $x$ is a whole number greater than 1, for example, from about 50 to 5,000 or more. Such compositions and methods for preparing the same are more particularly described in U.S. Pat. No. 2,607,792—Warrick. The use of steam in this fashion causes a decrease in the viscosity of the high molecular weight product, at the same time forming linear polysiloxanes having the terminal silicon-bonded hydroxyl groups.

An alternate method for making the linear fluid dimethylpolysiloxanes containing terminal silicon-bonded hydroxy groups comprises adding water to the high molecular weight polymers described above in such amounts that when heated at elevated temperatures, for instance from about 150° to 170° C, the viscosity is reduced to the desired level of from 100 to 100,000 centipoises. The amount of water used will vary depending upon such factors as the molecular weight of the polymer being treated, the time and temperature at which the polymer being treated will be heated, the ultimate viscosity desired, etc. The amount of water used to reduce the molecular weight can be readily determined. For example, a linear fluid dimethylpolysiloxane containing terminal silicon-bonded hydroxyl groups and having a viscosity of from 1,000 to 2,000 centipoises can be obtained by heating a high molecular weight dimethylpolysiloxane prepared in accordance with the directions above, of about 2,000,000 centipoises viscosity, with 0.5 percent, by weight, of water for about 2 hours at 150° to 170°C.

While the polydimethylsiloxane having silanol chain terminals is generally preferred, up to about 50 percent of the polysiloxane can be formed with siloxy units containing the other organic radicals mentioned above. For example, a mixture of octamethylcyclotetrasiloxane and a cyclic polymer of ethylmethylsiloxane having the formula:

7) $[(CH_3)(C_2H_5SiO)]_m$, where $m$ is as previously defined, can be employed. Additionally, mixtures of cyclic polymers of polydimethylsiloxane with cyclic polymers of polydiphenylsiloxane, polymethylphenylsiloxane, etc. are useful as starting materials for the preparation of silanol-terminated organopolysiloxanes for use in accordance with this invention.

In general, the room temperature vulcanizing silicone rubber composition contains, on the basis of 100 parts of the silanol-terminated organopolysiloxane, from two to 15 parts of the chelate of formula (1), and preferably from five to 10 parts.

In addition to the compound of formula (1), and the silanol-terminated organopolysiloxane, the room temperature vulcanizing composition can contain a filler. Various fillers can be employed including, for example, titanium dioxide, lithopone, zinc oxide, zirconium silicate, silica aerogel, iron oxide, diatomaceous earth, calcium carbonate, fumed silica, precipitated silica, finely divided glass fibers, etc. When these fillers are used, they should be used in an amount of from 10 to 300 parts, and preferably from 20 to 100 parts, by weight, per 100 parts of the silanol-terminated organopolysiloxane. In addition, other materials can be included in the formation to provide various properties as, for example, the inclusion of cupreous materials, such as, copper, copper oxides and copper halides, to provide such properties as flame resistance.

In addition to the reaction of materials of formulas (2) and (3) to form the chelate of formula (1), the reaction can be carried out between the organosilane of formula (3) and a diketone derivative, such as the monosodium salt of the diketone. Other methods will be apparent to those skilled in the art.

The following examples are given for purposes of illustration and should not be considered as limiting in any way the full scope of the invention as covered in the appended claims. All parts in these examples are by weight.

EXAMPLE 1

Into a reaction vessel were placed 64 parts of dry diethyl ether and 10 parts of methyltrichlorosilane. To the resulting solution was added 10 parts of 2,4-pentanedione. The resulting reaction mixture was allowed to stand for one-half hour and a large crop of white crystals resulted. These crystals, which represented the desired product of formula:

(8)

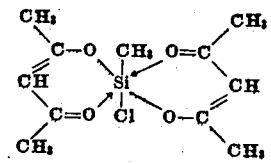

were isolated by decanting the supernatant liquid. The crystals were washed with a small, additional portion of diethyl ether and were then "dried" in a vacuum.

EXAMPLE 2

Four parts of the chelate of formula (8) were dissolved in 30 parts of dry chloroform and the solution treated with five parts of anhydrous sodium acetate. A quantity of 10 parts of diethyl ether were added and an immediate exothermic reaction resulted. The reaction mixture was kept under agitation until no further heating was evident. The mixture was filtered and the filtrate flash evaporated in order to remove the solvents. The infrared spectrum of the resulting clear liquid was consistent with the structure:

(9)

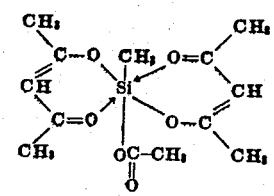

EXAMPLE 3

In a manner similar to example 1, similar quantities of the monosodium salt of 2,4-pentanedione of formula:

(10)

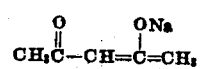

and methyltriacetoxysilane were reacted to product the product of formula (9).

EXAMPLE 4

The material of example 1 was used as a curing agent for a silanol-terminated organopolysiloxane, equivalent to formula (6) and having a viscosity at 25° of approximately 3,000 centipoises. A quantity of 0.6 part of the material of formula (8) was dissolved in 1.5 parts of chloroform and this was added to 10 parts of the described organopolysiloxane fluid. The mixture was thoroughly blended and was then allowed to stand in the atmosphere. A hydrogen chloride odor was evident during the initial stages of cure. Upon standing for 24 hours, the composition had cured and the surface was no longer tacky. After 40 hours, a complete cure of a ¼-inch thick section was accomplished, with the material having a slightly opaque, light yellow color.

EXAMPLE 5

A quantity of one part of the material produced according to example 2 was dissolved in 1.5 parts of chloroform and added to 10 parts of the organopolysiloxane fluid employed in example 4. The material was blended, thoroughly, and then allowed to stand. The odor of acetic acid was apparent over the surface of the material and after 1 hour a tackfree surface had formed. Cure was accomplished to a depth of approximately ⅛-inch during the first 15 hours and cure was complete after 40 hours.

While metallic salts are not necessary in cure of the silanol-terminated polysiloxanes employing the chelates of this invention, they can be useful in achieving a faster cure. In general, the metal salts of organic acids are derived from the class of metals consisting of lead, tin, zirconium, antimony, iron, cadmium, barium, calcium, titanium, bismuth, and manganese having acid radicals. Suitable acid radicals are those yielding the resinate, linoleate, stearate, oleate, or lower acid radicals, such as, those yielding the acetate, butyrate, the octoate, etc. radicals. Examples of operable metallic salts of carboxylic acids include, for example, dibutyl tin diacetate, tin naphthenate, tin octoate, tin oleate, tin butyrate, dibutyl tin diluarate, etc.

What I claim as new and desire to secure by letters patent of the United States is:

1. A chelate of silicon having the formula:

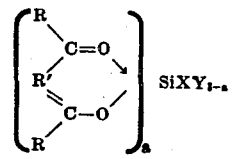

where R is selected from the class consisting of lower alkyl radicals, lower alkoxy radicals, and phenyl; R' is a radical for formula $-(CH_2)_n-CH=$, where $a$ is from 0 to 2; $n$ is from 0 to 2; X is acyloxy; and Y is selected from the class consisting of lower alkyl and phenyl.

2. The chelate of silicon having the formula:

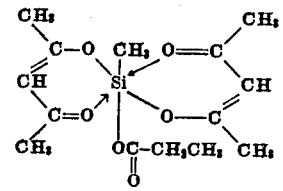

3. The chelate of silicon having the formula:

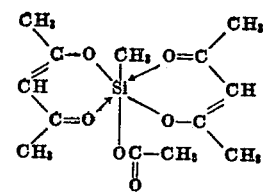

* * * * *